Aug. 19, 1941.  C. W. PETERSON  2,253,090
SPOOL HOLDING AND TENSIONING DEVICE FOR CAMERAS
Filed Nov. 4, 1939
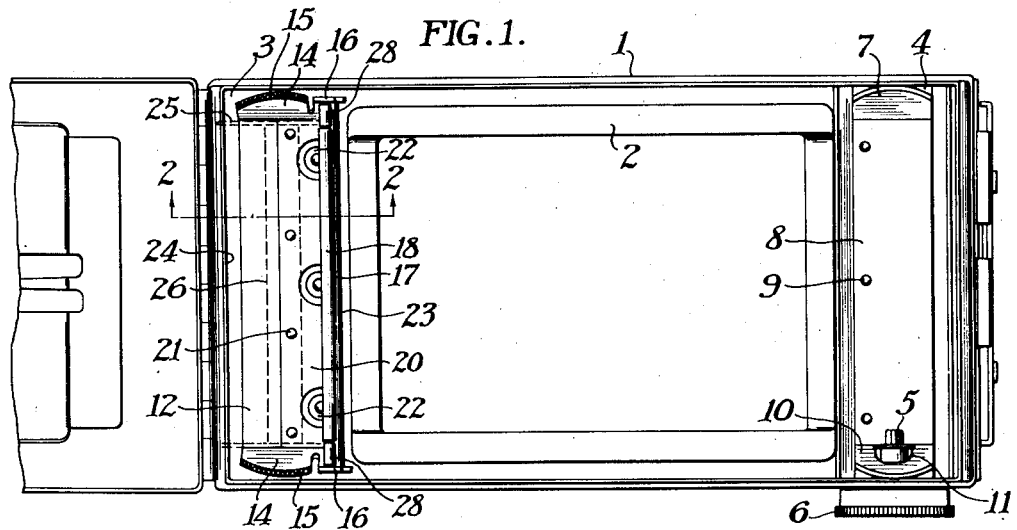
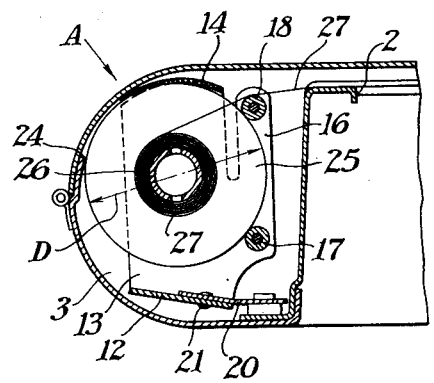
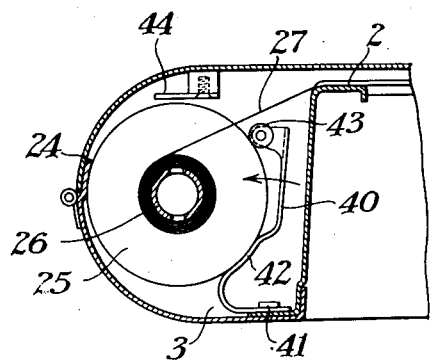
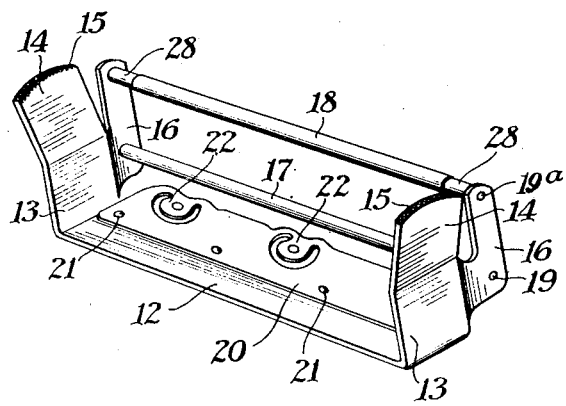
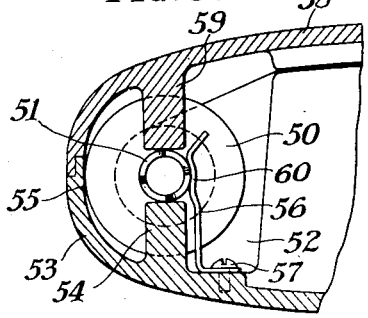
CHARLES W. PETERSON
INVENTOR
BY
ATTORNEYS Patented Aug. 19, 1941

2,253,090

UNITED STATES PATENT OFFICE 2,253,090

SPOOL HOLDING AND TENSIONING DEVICE FOR CAMERAS

Charles W. Peterson, Rochester, N. Y., assignor to Eastman Kodak Company, Rochester, N. Y., a corporation of New Jersey Application November 4, 1939, Serial No. 302,895

10 Claims. (Cl. 242—71)

This invention relates to photography and more particularly to roll holding cameras in which film, carried by spools, is used to receive the exposures.

One object of my invention is to provide a spool holder which is easy to load and unload. Another object of my invention is to provide a spool holder which will tend to frictionally retard the movement of the spool as film is wound through the camera and to maintain a relatively fixed tension on the film spool at all times. Another object of my invention is to provide a film spool support which acts as a brake on the film spool and in which the direction of the braking action is opposite to the direction of the film winding, so that by winding a film from the spool, some of the tension may be automatically released. A still further object of my invention is to provide a retarding film spool support so arranged that a uniform braking action will be applied to the flanges of the film spool throughout the winding operation, and other objects will appear from the following specification, the novel features being particularly pointed out in the claims at the end thereof.

Coming now to the drawing wherein like reference characters denote like parts throughout:

Fig. 1 is a rear elevation of a roll holding camera provided with a spool support constructed in accordance with and embodying a preferred form of my invention, the camera back being only partially shown in an open position.

Fig. 2 is a section taken on line 2—2 of Fig. 1 and showing the camera back in a closed position.

Fig. 3 is a section similar to Fig. 2, but showing a modified form of my invention.

Fig. 4 is a perspective view of the film holding device removed from a camera.

Fig. 5 is a transverse section through a camera illustrating still another embodiment of my invention.

In roll-holding cameras, it is customary to provide a fixed or uniform tension acting on the supply film spool to retard the movement of the supply film spool so that film may wind smoothly through the camera and so that the film may lie flat across the exposure aperture. Providing a fixed tension to act against a film spool has not proven satisfactory, because the mechanical advantage of the film winding mechanism, such as a winding knob or key, automatically decreases as the size of the take-up spool increases, with the oncoming convolutions of film and paper. Likewise, the mechanical advantage of the film unwinding from the supply spool decreases as the convolutions become smaller, and consequently, it usually happens that it is much more difficult to wind the last few exposures and the tail strip of film than it is to wind the leader strip and the first few exposures. It has been found by actual measurement that a difference of 200% frequently occurs.

In order to overcome these winding difficulties and to provide a camera in which the last film and the tail strip winds just as freely as the leader strip and the, first film, I have provided a spring bracket or cradle for holding the supply spool into which a film spool can readily be placed, the shape of the spring bracket being such that a flange of the film spool is always thrust against a portion of the camera to have a frictional and braking contact therewith. By providing this spring thrust diametrically opposite to the pull of the film, the braking action may be relieved during the winding operation and as the mechanical advantage of the film winding key is reduced by the increasing diameter of the take-up spool, the spring bracket may give more and more, releasing the braking action on the supply spool to equalize the winding movement.

As indicated in Fig. 1, the camera may comprise a body 1, having an exposure frame 2, across which film is drawn for exposures. A supply film spool chamber 3 is carried by the camera body at one end of the exposure frame 2 and a take-up spool chamber 4 is provided at the opposite end. The take-up chamber is preferably equipped with a key web 5 which is adapted to enter into a cooperating slot in the film spool so that the spool may be wound by turning the knurled knob 6 which forms the winding key.

In the embodiment shown in Fig. 1, a spool may be placed in the take-up chamber 4, with one flange in contact with the downwardly inclined surface 7 of a bracket 8 which is attached to the camera wall by means of rivets 9. A similar flange 10 is provided on the bracket at the key end, this flange being equipped with an opening 11 through which the winding key web 5 may be withdrawn for loading and unloading a film spool.

The supply spool chamber 3 is equipped with a different form of bracket, best shown in Fig. 4. In this case, the bracket 12 is provided with upturned ends 13 and outwardly flared ends 14 which are preferably knurled at 15 on their outer edges. The arms 13 are provided with upwardly extending projections 16, these projections supporting a lower roller 17 and an upper roller 18, both of which may turn on suitable trunnions 19 and 19a.

The base of the bracket 12 is attached to the camera by means of a spring plate 19a, this plate being riveted at 21 to the bracket 12 and carrying a series of spring rivet supports 22 which are fastened to the bottom wall 23 of the camera.

The bracket 12, as shown in Fig. 2, is so mounted in the camera that the distance between the upper roller 18 and an end wall 24 of the camera is less than the diameter D of the flange 25 of a film spool which is provided with the usual core 26 and the convolutions 27 of film and backing paper wound thereon.

In order to load the film spool 25 into the supply spool chamber 3, it is only necessary to thrust the spool downwardly in the direction shown by the arrow A of Fig. 2 to cause the flanges 25 to snap between the roller 18 and the end wall 24, the spring plate 20 bending during this operation. As soon as the spool slides downwardly into the position shown in Fig. 2, in which the spool flange 25 rests against the rollers 18 and 17, the bracket will hold a portion of the flanges D in contact with the end camera wall 24 so that there will be a friction or braking action between the flanges and this wall determined by the strength of the spring plate 20.

The film and backing paper 27 are led across the roller 18, across the exposure frame 2 and are attached to a spool carried by the take-up chamber 4. Thus, when the winding key 6 is turned, the web 5, through its engagement with a spool slot, not shown, turns the take-up spool, drawing film from the supply spool, and as this operation continues, the pull of the winding knob 6 effects the tension between the flanges D and the edge 24 of the camera wall, and consequently, effects the total braking action.

With this form of my invention, since the spool, when unwinding, would tend to turn the roller 18 in a counter-clockwise direction, I have provided small tubular sleeves 28 mounted to turn freely on the trunnions 19a so that the spool flanges may engage the sleeves 28 and not the roller 18. Thus, the sleeves 28 may turn in a counter-clockwise direction during the film winding movement while the roller 18 may turn in a clockwise direction, if the roller is positioned, as shown in Fig. 2, to engage the film.

However, I have found a satisfactory spool holding bracket can be made in accordance with the showing of Fig. 3, somewhat less expensively than the bracket above described.

In this figure, the film spool flanges 25 may be thrust against the fixed camera wall 24 by means of a single spring member 40, attached by rivets 41 in the supply spool chamber 3, and having a formed-up area 42 which may engage the film spool flanges and a roller 43, carried above the area 42 and in position to engage the spool flanges 25. In this embodiment of my invention, the film and paper convolutions 27 do not touch the roller as they approach the exposure frame 2 and a small bracket 44 is preferably provided to prevent any tendency of the film spool 25 from tending to pull out of the spool chamber during the winding movement. Thus, in this embodiment the thrust of the spring cradle 40 is shown in the direction shown by the arrow so that the flanges 25 are frictionally engaged with a portion of the camera wall. I have also found this type of film support and tensioning device is satisfactory for cameras which may be made of moldable material, and in Fig. 5 I have shown a fragmentary section of such a camera in which the film spool 50, which utilizes a film core, having outwardly extending trunnions 51, is mounted in a supply chamber 52 of a camera having molded exterior walls 53. In this instance, the trunnions 51 of the spool may rest upon molded pads 54, and an edge of the film spool 50 may be thrust against a portion 55 of the camera wall, forming an end of the spool chamber 52 by means of springs 56. One of these springs is mounted on each side of the spool chamber 52 by attaching it to the camera wall 53 by mean of a screw 57.

In this instance, the camera back 58 is provided with a downwardly extending pad 59 on each side of the spool chamber, this pad being positioned so as to lie directly above the pad 54 and to hold the spool trunnion 51 in an operative position when the back is on the camera.

As in the other embodiments of my invention, the spring 56 is so positioned that the spool 50 may be thrust into the spool chamber 52 against the action of the spring 56 which holds the flange 50 in frictional engagement with the camera and wall 55. Consequently, the spool may be readily snapped into position and the curved portion 60 of the spring tends to hold the spool in position until the camera back 58 is replaced, at which time, of course, the spool cannot become displaced vertically in the spool chamber 52.

In all of the embodiments above referred to, it will be noticed that the braking action occurs in a direction opposite to the direction of film winding and is caused by a spring or spring bracket thrusting the film spool flanges into frictional engagement with a portion of the camera walls. Thus, increased tension on the winding knob 6 merely serves to relieve somewhat the braking action caused by these springs, and I have found that it is a comparatively simple matter to select a spring of the proper tension to secure smooth and even winding throughout the entire roll so that the leader strip and tail strip, as well as the entire length of film, may be wound without any material difference in the torque required for turning the film winding key.

The operation of a camera constructed in accordance with my invention is extremely simple. In loading a film spool into the supply chamber 3, the spool is merely thrust down between the outer wall of the camera and the pressure roller or spring until it snaps into the proper winding position, after which the backing paper can be threaded to a spool which may be placed in the take-up chamber 4 by dropping it into place with the winding key 5 withdrawn through the opening 11. The camera back may be closed and the film wound in the usual manner.

One of the features of my invention is the spool cradle construction which facilitates unloading as well as loading. In unloading the empty spool from the cradle in the spool chamber 3, it is only necessary to draw the cradle somewhat toward the exposure frame 2 by means of one of the knurled edges 15 of the cradle ends 14 so that a spool may be readily lifted from its compartment. If desired, the flange of the spool and the knurling 14 may be simultaneously engaged on one side of the spool chamber so as to raise up the opposite end of the film spool as soon as the cradle moves a sufficient distance towards the exposure frame to release the spool flange 25 from its operable position.

What I claim is:

1. In a camera including film chambers and an exposure frame across which film may be wound substantially tangentially from a spool and toward the exposure frame for exposures, the combination with a spool chamber, of a spring film support therein positioned to engage a film spool placed in the camera, said spring film support including spool engaging portions tending to thrust the spool in a direction opposite to that in which film is wound from the spool toward the exposure frame and across the exposure frame to make an exposure.

2. In a camera including film chambers and an exposure frame across which film may be wound for exposure, the combination with a spool chamber, of a spring film support therein positioned to engage a film spool placed in the camera, said spring film support including spool engaging portions tending to thrust the spool in a direction opposite to that in which film is wound across the exposure frame to make an exposure, said spool chamber being greater in width than the width of the film spool, whereby movement of the spool against the pressure of the spring may take place.

3. In a camera through which film may be wound for exposure, the combination with a spool chamber, of an exposure frame adjacent the spool chamber, a spring film support adapted to carry a spool in position for film to be drawn substantially tangentially therefrom toward said exposure frame, said spring spool support being mounted in the spool chamber and tensioned to effect a thrust on the spool in a direction opposite to that in which the film passes toward the exposure frame.

4. In a camera through which film may be wound for exposure, the combination with a spool chamber, of an exposure frame adjacent the spool chamber, a spring film support mounted in the spool chamber between the exposure frame and the end of the spool chamber and being spaced from the end of the spool chamber a distance less than the width of a film spool, whereby a spool may be snapped into the chamber between the spring film support and an end chamber wall and whereby the spool may be resiliently spaced from the exposure frame.

5. In a film supporting device for cameras, the combination with a camera body having spool chambers spaced by an exposure frame across which film may be wound from one chamber to the other, of a spool supporting device, a spring member incorporated in the spool supporting device positioned to normally thrust the spool in a direction opposite to that in which the film moves in passing over the exposure frame and into frictional engagement with a wall of a spool chamber, and means for winding the film across the exposure frame and against the tension of said spring member.

6. In a film supporting device for cameras, the combination with a camera body having spool chambers spaced by an exposure frame across which film may be wound from one chamber to the other, of a spool supporting device, a spring member incorporated in the spool supporting device and including coaxially arranged rollers for engaging the flanges of the spool and the film and backing paper drawn therefrom, whereby the rollers engaging the flanges may move in one direction while the roller engaging the film may turn in an opposite direction.

7. In a film supporting device for cameras, the combination with a camera body having spool chambers spaced by an exposure frame across which film may be wound from one chamber to the other, of a spool supporting device, a spring member incorporated in the spool supporting device and including coaxially arranged rollers for engaging the flanges of the spool and the film and backing paper drawn therefrom, whereby the rollers engaging the flanges may move in one direction while the roller engaging the film may turn in an opposite direction, said coaxially arranged rollers, under the impulse of the spring member, tending to frictionally engage the spool flanges against a wall of the spool chamber spaced from the exposure frame.

8. In a film supporting device for cameras, the combination with a camera body having spool chambers spaced by an exposure frame across which film may be wound from one chamber to the other, of a spool supporting device, a spring member incorporated in the spool supporting device, said spring member including trunnions, a roller supported by the trunnions, the tension of the spring tending to shift the roller and spool until said spool frictionally engages the spool chamber on a wall spaced from the exposure frame, whereby film drawn across the roller may tend to relieve the frictional contact.

9. In a roll holding camera including an end wall enclosing part of a spool chamber, an exposure frame and means for winding film from a spool in said spool chamber across the exposure frame, a spring bracket adjacent the exposure frame and adapted to press a film spool into frictional engagement with a wall of the camera, said film winding means being adapted to draw the film from the spool against the direction of the spring tension, whereby the braking action of the spool flanges upon the camera wall may be relieved at least in part during the film winding operation.

10. In a roll holding camera including spool chambers in end walls thereof and an exposure frame across which film may be drawn from a flanged spool for exposure, the combination with means for winding film in one spool chamber, a spool support in the other chamber including a spring bracket, a spool engaging surface thereon spaced from an end wall of the camera a distance less than the diameter of the film spool flanges, whereby said spring bracket may press the spool flanges into braking engagement with the end wall of the camera in a direction opposite to that in which the film may be wound, said spring bracket being positioned to permit yielding toward said exposure frame, whereby a spool may be snapped into position between said spring bracket and wall of said spool chamber.

CHARLES W. PETERSON.